Patented Apr. 1, 1924.

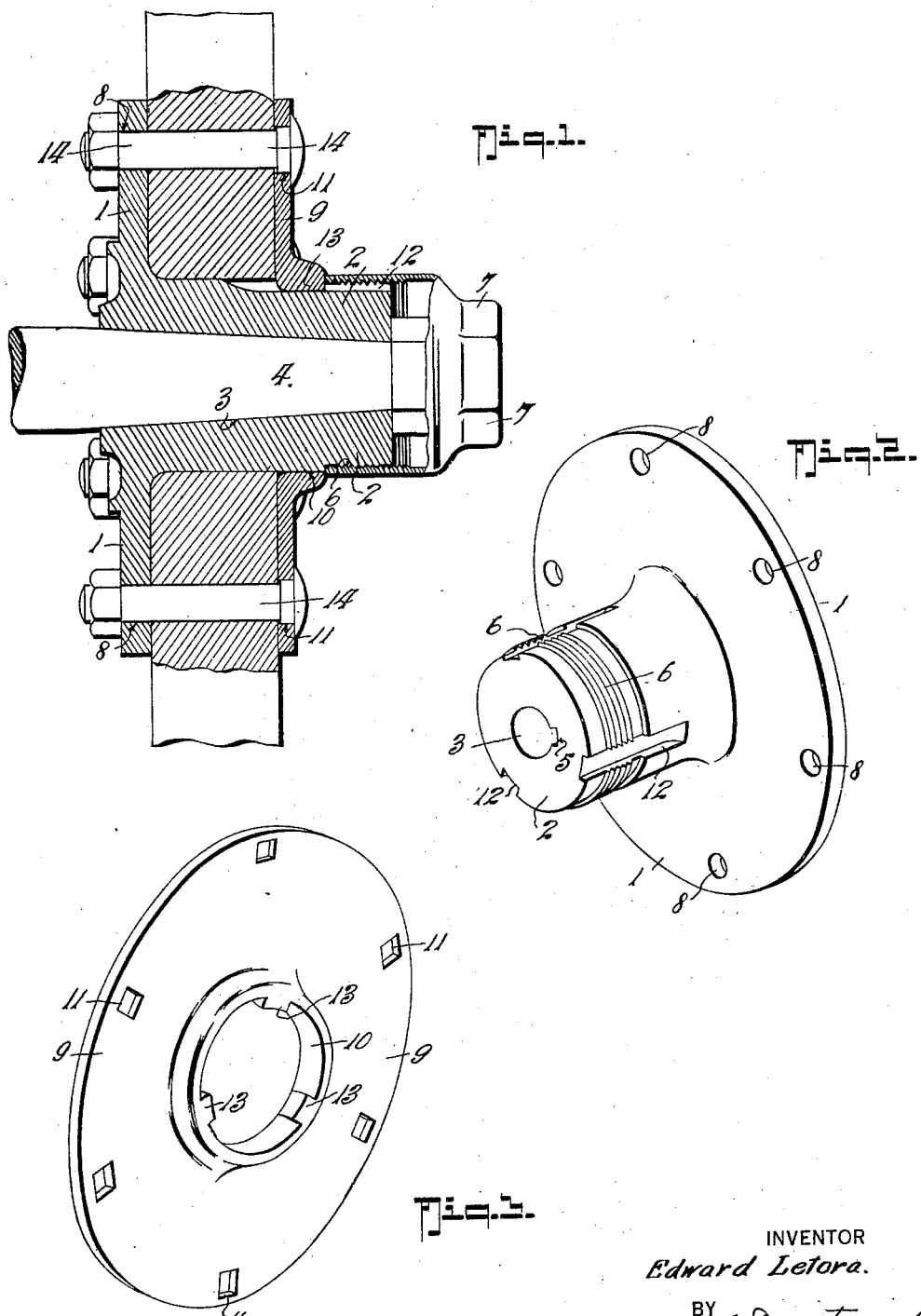

1,488,758

UNITED STATES PATENT OFFICE.

EDWARD LETORA, OF SHEEPRANCH, CALIFORNIA.

WHEEL HUB.

Application filed June 26, 1923. Serial No. 647,845.

*To all whom it may concern:*

Be it known that I, EDWARD LETORA, a citizen of the United States, residing at Sheepranch, in the county of Calaveras and State of California, have invented a new and Improved Wheel Hub, of which the following is a specification.

The invention generally relates to certain new and useful improvements in wheel hub structures and most particularly to that type of wheel hubs adaptable for use upon the well-known Ford automobile.

In the practical use of the conventional type of wheel hub particularly referred to, much difficulty is experienced due to the frequent breaking of the same with the result of extreme inconvenience, if not serious accident.

Therefore, the invention has for its object to provide a wheel hub of the type stated, which is so constructed as to insure practical functioning of the same, for the purposes for which it is designed, even though a breakage thereof should occur in the manner and at the places where such breakage usually occurs in the type of hub stated.

With the above and other objects in view that will hereinafter appear, the invention resides in those novel details of construction, combination of and arrangement of parts, all of which will be first fully described, then be particularly pointed out in the appended claims, reference being had to the accompanying drawing, in which:

Figure 1 is a vertical cross section of a portion of a wheel and illustrates the practical application of my invention thereupon.

Figure 2 is a detail perspective view of the main hub plate and the hub.

Figure 3 is a detail perspective view of the outer or removable hub plate.

In the drawing, in which like numerals of reference indicate like parts in all of the figures, 1 indicates the main hub plate which has formed integrally therewith a sleeve portion 2 which is provided with a tapered bore 3 for suitably accommodating the axle portion 4 (see Figure 1). The axle portion 4 is keyed to the sleeve portion 2 as at 5. The sleeve 2 is also provided with a threaded portion 6 for receiving the internally threaded hub cap 7, and the main plate 1 is provided with suitable bolt holes 8.

It will be observed that all of the foregoing is a description of the common type of Ford hub and consists of the inner or main portion of the same, that is, the main plate and integral sleeve.

A second plate 9 is provided which includes a central aperture 10 adapted to fit over the sleeve portion 2 formed on the main plate 1 and this second or cap plate is provided with the usual bolt apertures 11, see Figure 3.

It will also be observed that the foregoing paragraph is descriptive of the common type of removable hub plate used on the conventional type of wheel hub, above referred to.

When a wheel hub, the parts of which have above been described, is used constructed as there described, inconvenience and accident is frequently caused by breakage of the hub at an inopportune moment. It is a common experience in the use of the hubs thus constructed, to have the main plate 1 crystallize and break at a point between the connection of the main plate 1 with the wheel member and the connection of the sleeve portion 2 with the axle 3, thus making it possible for the said axle 3 to freely rotate without in any manner affecting the wheel to which it was formerly fixedly connected.

It will be readily understood that should such a breakage occur while the machine was traversing a steep grade, all control of the wheel to which the broken hub was attached would be lost, with the result of certain great inconvenience and possible serious accident.

It is the purpose of my invention to positively remedy the faults above referred to, and in the practical development of my invention I provide the sleeve portion 2 of my improved wheel hub with a plurality of cross grooves 12, see Figure 2. For cooperating with these cross grooves 12, I provide the removable cap plate 9 with a like number of inwardly projecting lugs 13 adapted to engage the grooves 12 when my improved wheel hub is securely mounted upon the wheel and fixedly held with relation thereto by the clamp bolts 14, as shown in Figure 1.

When the parts are constructed as above described, and properly secured upon the wheel, as indicated in Figure 1, just referred to, the second or removable plate 9 is held to absolutely fixed relation with the sleeve portion 2 and its integrally formed main plate 1 so that should any breakage between the sleeve and its integral plate 1 occur, as above described, the said removable plate 9 would be in such fixed relation with the axle and the wheel, through its common action with the hub as above described, that the said axle would not be left free to rotate without exercising its functions on the wheel so that the inconvenience of an immediate break down would be obviated and the danger of serious accident entirely done away with.

It is obvious that should breakage occur in the case of the second plate 9 rotation of the wheel would not be affected because of the relation of the integral sleeve portion with the main plate as is now common.

From the foregoing description, taken in connection with the drawing by which it is accompanied, all of the novel details of construction of my invention, the cooperation and advantages thereof will be readily apparent to those familiar with the use of wheel hubs of the type stated.

What I claim is:

1. A wheel hub comprising a plate having bolt apertures, a sleeve portion integral with said plate and having a bore to receive an axle end, said sleeve portion being provided with a plurality of grooves, a second plate mountable over said sleeve portion and being provided with lugs for engaging said grooves and with apertures in alignment with said bolt apertures, substantially as and for the purpose described.

2. A wheel hub comprising a plate having bolt apertures, a sleeve portion integral with said plate and having a bore to receive an axle end to be secured thereto and having the peripheral continuity thereof broken, a second plate mountable over said sleeve portion and being provided with bolt apertures in cross alignment with those of the other plate, said sleeve portion having recesses, and lugs on said second plate for engaging the recesses in said sleeve portion in a manner for preventing rotation of said second plate upon said sleeve portion.

EDWARD LETORA.